(12) United States Patent
Allred (10) Patent No.: US 6,289,367 B1
(45) Date of Patent: Sep. 11, 2001

(54) DIGITAL SIGNAL PROCESSING CIRCUITS, SYSTEMS, AND METHOD IMPLEMENTING APPROXIMATIONS FOR LOGARITHM AND INVERSE LOGARITHM

(75) Inventor: Rustin W Allred, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/192,981

(22) Filed: Nov. 16, 1998

(51) Int. Cl.$^7$ .................................................. G06F 7/556
(52) U.S. Cl. .................................................. 708/277
(58) Field of Search .................................. 708/277, 512, 708/517

(56) References Cited

U.S. PATENT DOCUMENTS

| | | | | |
|---|---|---|---|---|
| 5,365,465 | * | 11/1994 | Larson | 708/512 |
| 5,642,305 | * | 6/1997 | Pan et al. | 708/277 |
| 5,703,801 | * | 12/1997 | Pan et al. | 708/277 |
| 5,801,974 | * | 9/1998 | Park | 708/277 |
| 5,831,878 | * | 11/1998 | Ishida | 708/277 |

OTHER PUBLICATIONS

"Computation of the Base Two Logarithm of Binary Numbers," IEEE Trans. Electron. Comput., EC–14, pp. 863–867, 1965 (M. Combet, H. Van Zonneveld, and L. Verbeek).

"New Algorithms for the Approximate Evaluation of Hardware of Binary Logarithms and Elementary Functions," IEEE Trans. Comput., C–21, pp. 1416–1421, 1972 (D. Marino).

"A Note on Base–2 Logarithm Computations," IEEE Proc., 61, pp. 1519–1520, 1973 (J.C. Majithia and D. Levan).

"A Class of Algorithms for Ln x, Exp x, Sin x, Cos x, Tan$\Lambda$–1 x and Cot$\Lambda$–1 x, " IEEE Trans. Electron. Comput., EC–14, pp. 85–86, 1965 (W. H. Specker).

* cited by examiner

Primary Examiner—David H. Malzahn
(74) Attorney, Agent, or Firm—Dwight N. Holmbo; Wade James Brady, III; Frederick J. Telecky, Jr.

(57) ABSTRACT

A digital signal system (100) for determining an approximate logarithm of a value of x having a base b. The approximate logarithm includes an integer portion (i) and a decimal portion (f). The system comprises an input (12) for receiving a signal, and circuitry (18) for measuring an attribute of the signal. The attribute relates at least in part the value of x. The system further comprises circuitry (104) for identifying a bounded region within which x falls. The bounded region is one of a plurality of bounded regions, where each of the plurality of bounded regions corresponds to a different value of an integer n and is bounded on a lower side by $b^n$ and on a higher side by $b^{n+1}$. Additionally, the identified bounded region identifies the integer portion of the approximate logarithm. The system further comprises circuitry (106, 108) for determining the decimal portion of the approximate logarithm by mapping a portion of x to a point along a curve representing an approximation of a portion of an actual logarithm value of x.

40 Claims, 3 Drawing Sheets

DIGITAL SIGNAL PROCESSING CIRCUITS, SYSTEMS, AND METHOD IMPLEMENTING APPROXIMATIONS FOR LOGARITHM AND INVERSE LOGARITHM

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to signal processing, and are more particularly directed to digital signal processing circuits, systems, and methods implementing approximations for logarithm and inverse logarithm.

Digital signal processing is prevalent in numerous types of contemporary technologies, and involves various types of devices, signals, and evaluations or operations. For example, devices involved in signal processing may include a general purpose digital signal processor ("DSP"), an application specific processor, ("ASP"), an application specific integrated circuit ("ASIC"), a microprocessor, or still others. The types of processed signals may include various types of signals, where audio signals are a relevant example for reasons detailed below. Lastly, the operations on these signals may include numerous logic and arithmetic-type operations, where such operations may occur with a general purpose arithmetic logic unit or dedicated hardware/software included within the device performing the signal processing. The present embodiments arise within these considerations, as further explored below.

Given the various device types, signals, and operations involved in signal processing, it is recognized in connection with the present embodiments that the precision involved with some types of signal processing may be less than that required in other contexts. For example, the precision expected of a mathematical calculation performed by a hand held calculator or central processing unit may be considered to define a standard that is relatively high, while the precision required of some other signal processing may be lower than this high standard. One example where lower precision in signal processing may arise is in an audio signal processor or processing system. Such a system may perform various signal processes and ultimately output an audio signal to be played by a speaker or the like. However, since the human ear is forgiving of various signal fluctuations, then likewise the signal processing involved may have a lesser standard of precision than is required of the above-mentioned examples of a hand held calculator or central processing unit. Consequently, the present embodiments have particular application for this and other instances of signal processing that require less than exact signal evaluation.

By way of further background, it is noted that some contemporary digital processing systems implement relatively costly solutions to signal processing. For example, the present embodiments provide approximations to the functions of logarithms and inverse logarithms. Thus, where the present embodiments are not used, alternative systems may require sophisticated arithmetic logic units or the like to perform these logarithmic functions. Such approaches may cause numerous problems, such as increasing device size, complexity, and consequently, device cost. Moreover, in some implementations these increases are simply unacceptable, in which case designs in their entirety may have to be discarded or, at a minimum, considerably altered given the overall system specifications.

In view of the above, there arises a need to address the drawbacks of prior systems which require complex implementations to determine logarithmic functions, and to provide efficient circuits, systems, and methods for determining an acceptable approximation for such functions.

BRIEF SUMMARY OF THE INVENTION

In one embodiment there is a digital signal system for determining an approximate logarithm of a value of x having a base b. The approximate logarithm includes an integer portion and a decimal portion. The system comprises an input for receiving a signal, and circuitry for measuring an attribute of the signal. The attribute relates at least in part the value of x. The system further comprises circuitry for identifying a bounded region within which x falls. The bounded region is one of a plurality of bounded regions, where each of the plurality of bounded regions corresponds to a different value of an integer n and is bounded on a lower side by $b^n$ and on a higher side by $b^{n+1}$. Additionally, the identified bounded region identifies the integer portion of the approximate logarithm. The system further comprises circuitry for determining the decimal portion of the approximate logarithm by mapping a portion of x to a point along a curve representing an approximation of a portion of an actual logarithm value of x. Other circuits, systems, and methods are also disclosed and claimed, including but not limited to those directed to antilogs.

DETAILED DESCRIPTION OF THE INVENTION

Figure 1:
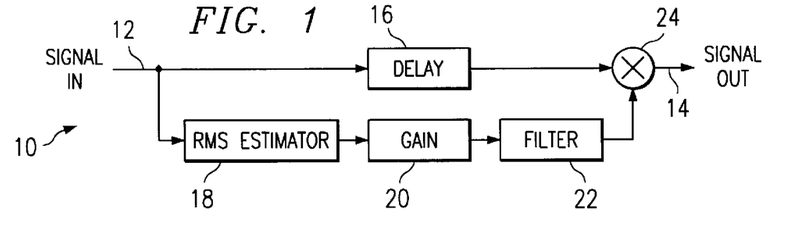
FIG. 1 illustrates a block diagram of a dynamic range compressor within which the preferred embodiments may be implemented.

FIG. 1 illustrates a block diagram of a dynamic range compressor 10, and which is shown by way of illustration as a signal processing device in which the preferred embodiments may be implemented. Dynamic range compressor 10 receives an audio signal at a signal input 12 and, as demonstrated below, provides an output signal at an output 14 in response to the input signal. Before detailing the relationship of the input and output signals, first consider the signal path between input 12 and output 14, which is as follows. Input 12 is connected to the input of a delay circuit 16, and also to the input of an RMS (root mean square) estimator 18. The output of RMS estimator 18 is connected to the input of a gain circuit 20. The output of gain circuit 20 is connected to the input of a filter 22. The output of filter 22 is connected to an input of a combiner 24, which also has an input connected to receive the output of delay circuit 16. Lastly, each block of dynamic range compressor 10 is shown to demonstrate the overall operation of the device, and from this discussion as well as the skill in the art various circuits may be constructed to achieve this operation. Moreover, while the blocks are separately shown, note that some of the functions of the blocks may be combined or overlap, particularly in view of the type of device or devices used to implement the compressor.

The operation of dynamic range compressor 10 is now described generally, with a more detailed discussion below. Generally, compressor 10 operates to provide an output signal which has an amplitude swing that is more limited than what is expected of the input signal. In other words, a device such as dynamic range compressor 10 is typically included in a system where there are components within the system that are limited in a manner that cannot handle the anticipated amplitude swing of the input signal at input 10; thus, dynamic range compressor 10 operates to attenuate, or "compress", that swing so that the limitations of these components are not reached. For example, in an audio environment, the output signal may be used to drive a speaker via an A/D converter and appropriate amplification. Thus, any of these devices may have a limited input range, and by using dynamic range compressor 10 these limits may be avoided so as not to damage the device or cause undesirable operation.

Looking in more detail to the operation of compressor 10, the input signal is delayed by delay circuit 16, and at the same time is processed by the series of circuits consisting of RMS estimator 18, gain circuit 20, and filter 22. Thereafter, the result of these series of circuits is used to modify the delayed signal via combiner 24, and the ultimate result is the output signal at output 14. Turning to the details of the operation of the series of circuits, RMS estimator 18 determines a measure of the energy of the input signal. In this regard and importantly for context in the preferred embodiment, note that the measure analysis is in the context of an RMS evaluation. More specifically, the input signal is measured by RMS estimator, and one of its attributes (e.g., amplitude) is represented by a measurement which, for purposes of the following discussion, is represented by a value x. Next, the RMS evaluation is made, and as known in the art, such an evaluation is in units of dB, and dB are determined in view of a logarithm as shown in the following Equation 1:

$$dB = 20 \log_{10}(x) \quad \text{Equation 1}$$

The logarithm determination of estimator 18 and relating to Equation 1 is next used to determine the gain to be applied by gain circuit 20. Generally speaking, gain circuit 20 operates so that for a certain range of input signals, the gain is simply 1, that is, the output signal matches the input signal in amplitude (i.e., for every 1 dB in there is 1 dB out). However, for an input signal having an energy beyond a certain threshold, the output is attenuated such that there is 1 dB out for every N dB in, where N exceeds 1. Still further, for some compressors, additional thresholds may be set where, for each such threshold, there is another scale factor implemented by gain circuit 20 and, hence, additional levels of attenuation for even larger input signals. In any event, and also importantly for the context of the preferred embodiment, note that the adjustment by gain circuit 20 is typically achieved in part through the use of an inverse logarithm. In this context, therefore, the inverse logarithm is taken of the value f(x), which recall was based on the measurement x corresponding to an input signal. Next, the adjusted signal from gain circuit 20 is passed to filter 22. Filter 22 operates to smooth the transitions which may arise from gain circuit 20. In the context of audio operations, therefore, filter 22 preferably prevents any stark change in signal output which could be detected by the human ear. Specifically, filter 22 uses different time constants based on whether the gain is increasing or decreasing, where these time constants relate to what is referred to in the art as attack and decay. Lastly, the signal output from filter 22 is combined via combiner 24 with the delayed input signal output by delay circuit 16, thereby presenting an output signal at output 14 for driving a speaker via an A/D converter and appropriate amplification. To the extent the reader is interested in additional knowledge regarding dynamic range compressors as may be applied to compressor 10, the reader is directed to co-pending U.S. patent application Ser. No. 09/407,552, entitled "LOW IMPLEMENTATION COST SCALABLE ARCHITECTURE DYNAMIC RANGE COMPRESSOR", filed on the same date as the present application, having the same sole inventor as the present application, and hereby incorporated herein by reference.

Having described dynamic range compressor 10 and its operation in general, the present embodiments demonstrate implementations directed to approximating a logarithm and inverse logarithm, and in this regard the present inventor has determined various considerations relative to the base 10 nature of Equation 1. Specifically, while Equation 1 is stated in terms of base 10, it has been observed in connection with the present inventive scope that in some contexts, such as in dynamic range compressors, the same type of general relationship between input and output signals may be evaluated in other numeric base systems. In other words, the behavior of the input/output relationship is the same or similar regardless of whether the energy evaluation of estimator 18 is made in base 10 or in another base. Still further, the preferred embodiments described below are implemented using digital circuits and operate in the context of binary operations which necessarily give rise to the direction of base 2 operations. Accordingly, various embodiments are provided below that perform signal processing logarithmic determinations in base 2 rather than base 10. However, various of these inventive considerations may be implemented in other bases, including base 10. Still further, note that logarithms of different bases have the mathematical relationship shown in the following Equation 2:

$$\log_a(z) = \frac{\log_b(z)}{\log_b(a)} \quad \text{Equation 2}$$

From Equation 2, one skilled in the art will appreciate that given a determination of a logarithm in a first base (e.g., base b), that determination may be scaled by a constant (i.e., $1/\log_b(a)$) to determine a logarithm in a second base (e.g., base a). Accordingly, while the following discussions are directed to base 2 determinations, it also should be noted that the results may be scaled by a constant to achieve a base 10 or other base determination.

Attention is now directed to the preferred methodologies for approximating the values for a base 2 logarithm. Thus, by way of introduction, it is the purpose of the following discussion to provide an approximation for Ax) in the following Equation 3:

$$f(x)=\log_2(x) \qquad \text{Equation 3}$$

To implement a digital circuit solution to Equation 3, and for reasons apparent later in this document, the present inventor has recognized that it is helpful to solve Equation 3 by breaking the solution into an integer and fraction portion, as defined in the following Equation 4:

$$\log_2(x)=i+f \qquad \text{Equation 4}$$

where, i is the integer portion of the solution of Equation 4; and f is the decimal portion of the solution of Equation 4.

For an example of Equation 4, consider the simple case of x=4, then for $\log_2(4)$, i=2 and f=0. To ultimately provide an approximate solution for Equation 3, the preferred embodiments set forth to separately determine i and f as shown in Equation 4, and then Equation 3 may be solved by adding these two separately determined values. The preferred methodologies for determining each of these addends are discussed below.

Turning now to the methodology for determining i in Equation 4, and also for reasons apparent later in this document, the present inventor also has recognized that in a digital circuit implementation of Equation 3, it is helpful to further separate x in f (x) as in the following Equation 5:

$$x=l+r \qquad \text{Equation 5}$$

where, l is the largest power of 2 such that $1 \leq |x|$; and r is the remaining portion of x not included in l.

For an example of Equation 5, consider the case of x=43. Thus, l equals the highest power of 2 which is equal to or less than 43 and, therefore is equal to 32 (i.e., $2^5=32 \leq 43$). In addition, the remainder r is therefore equal to 11 (i.e., 43−32=11).

The implication of Equation 5 in the present embodiments as implemented in a digital circuit is now further appreciated by letting l from Equation 5 further be defined by the following Equation 6:

$$l=2^n \qquad \text{Equation 6}$$

As an example to appreciate the value of n in Equation 6, consider again the case of x=43. Recalling that l equals the highest power of 2 which is equal to or less than 43 (i.e., l=32), then n is the power of 2 which results in l and, thus, n=5 (i.e., $2^5=2^5=32$).

Next, substituting the value of l from Equation 6 into Equation 5 yields the following Equation 7:

$$x=l+r=2^n+r \qquad \text{Equation 7}$$

From Equations 6 and 7 it becomes evident that another way to determine the value of l is to determine the value of n, and l therefore may be determined by raising 2 to the power of n. This observation is noteworthy in the present embodiments because below it is related to viewing how numbers represented in binary fashion may be processed in a digital circuit to implement the preferred embodiment. Particularly, the preferred embodiment uses the advantage arising from the realization that for a number represented in binary form, the value of n in Equations 6 and 7 is equal to the location of the most significant non-zero bit in the binary representation. To demonstrate this notion with an example, consider again the case where x=43; for this example, then the value of x in an eight-bit binary representation is shown immediately below in Table 1, which also identifies the position of each bit in the representation.

TABLE 1

| Binary value for x = 43 | 0 | 0 | 1 | 0 | 1 | 0 | 1 | 1 |
|---|---|---|---|---|---|---|---|---|
| Bit position | 7 | 6 | 5 | 4 | 3 | 2 | 1 | 0 |

In Table 1, note that bits are listed with the more significant bits to the left and the lesser significant bits to the right, and this convention is followed through the remainder of this document; however, this convention is also only by way of illustration and one skilled in the art will appreciate that the present teachings equally apply where the bits are arranged in opposite order. Given this convention and the illustration of Table 1, it is seen that the most significant non-zero bit in the binary representation occurs in bit position 5. Thus, consistent with the premise accented above, the value of n in Equations 6 and 7 equals that bit position, and for x=43, therefore n=5 (i.e., $2^n=2^5$). For purposes of the remainder of this document, this digit, that is, the one in the position of the most significant non-zero bit, is referred to as a most significant digit ("MSD").

From the above, it now may be appreciated by one skilled in the art that n is ascertainable from a binary representation of the value of x in that the value of n is determined by locating the MSD in x. In other words, the MSD=n. In this regard, the preferred techniques for determining the MSD are discussed later. At this point, however, it is useful to demonstrate that the preceding variable definitions result in the value of n equaling the value of i in Equation 4. For purposes of later reference, therefore, this relationship is denoted below as Equation 8:

$$n=MSD=i \qquad \text{Equation 8}$$

This relationship set forth in Equation 8 is readily appreciated by continuing with the example of x=43, and is further explored with some other examples immediately below.

For x=43, it has been shown that the MSD, which also is defined as n, equals 5. Also, using a calculator to solve Equation 4 for the value of i, results in the following Equation 9:

$$\log_2(43)=i+f=5+f \qquad \text{Equation 9}$$

In other words, the integer portion of the base 2 logarithm, i, has now been shown to be the same as the MSD. By way of another example, assume that x=70. Thus, the binary representation of 70 is as shown in the following Table 2:

TABLE 2

| Binary value for x = 70 | 0 | 1 | 0 | 0 | 0 | 1 | 1 | 0 |
|---|---|---|---|---|---|---|---|---|
| Bit position | 7 | 6 | 5 | 4 | 3 | 2 | 1 | 0 |

From Table 2, therefore, the MSD for x=70 is 6. Thus, under the above proposition, this MSD of 6 is also equal to i. This may be confirmed through a calculator or the like, which indicates that $\log_2(70)=6.129$. In other words, in terms of Equations 4 and 8, i equals 6. As one final example, assume that x=31. Thus, the binary representation of 31 is as shown in the following Table 3:

TABLE 3

| Binary value for x = 31 | 0 | 0 | 0 | 1 | 1 | 1 | 1 | 1 |
|---|---|---|---|---|---|---|---|---|
| Bit position | | 7 | 6 | 5 | 4 | 3 | 2 | 1 | 0 |

From Table 3, therefore, the MSD for x=31 is 4. Thus, under the above proposition of Equation 8, this MSD of 4 is also equal to i. This may be confirmed through a calculator or the like, which indicates that $\log_2(31)=4.954$. In other words, in terms of Equations 4 and 8, i equals 4. From the preceding, therefore, as well as other examples that may be performed by one skilled in the art, it is shown that by determining the MSD given a binary representation, then a methodology for determining i in Equation 4 has been provided. Thus, once n is determined, there is correspondingly a solution determined for i. Recall that determining i is part of what was set forth as the goal to solving Equation 4 and, hence, by determining n (and i), a partial result toward the end result of the present embodiments is provided.

To continue the discussion of the preferred method of approximating a solution to Equation 4, the discussion now turns to the preferred method for determining the fractional portion, f, in that Equation. Before proceeding note that it has been shown how the preferred embodiment uses the MSD in the binary representation of x to determine the value of i in Equation 4; next, the preferred embodiment uses the remaining bits of that same binary representation to determine an approximation for f. In this regard, recall that Equation 5 separates a binary number into 1, its largest power of 2, and r, the remainder. The reason for this separation will now be more apparent in that the use of l (i.e., $2^n=2^{MSD}$) has been shown for determining i, and now the discussion demonstrates the use of r in determining an approximation for f.

As introduced above, the preferred embodiment determines f based on an approximate relationship between f and r. This relationship is perhaps best explained by observing the habits of r and f based on plots of those values, and those plots are first introduced by re-writing some of the previous Equations. In regard to demonstrating r, Equation 5 is first re-written below as Equation 10, where the terms are re-arranged to solve for r:

$$r=x-l \qquad \text{Equation 10}$$

Next, substituting the value of l from Equation 6 into Equation 10 yields the following Equation 11:

$$r=x-2^n \qquad \text{Equation 11}$$

In regard to demonstrating f, Equation 4 is now re-written below as Equation 12, where the terms are re-arranged to solve for t $$f=log_2(x)-i \qquad \text{Equation 12}$$

Also, recalling from Equation 8 that i=n, then substituting this into Equation 12 yields the following Equation 13:

$$f=log_2(x)-n \qquad \text{Equation 13}$$

Having developed Equations 11 and 13 for r and f respectively, FIGS. 2 and 3 now illustrate respective plots for r and f and are discussed in detail below.

Figure 2:
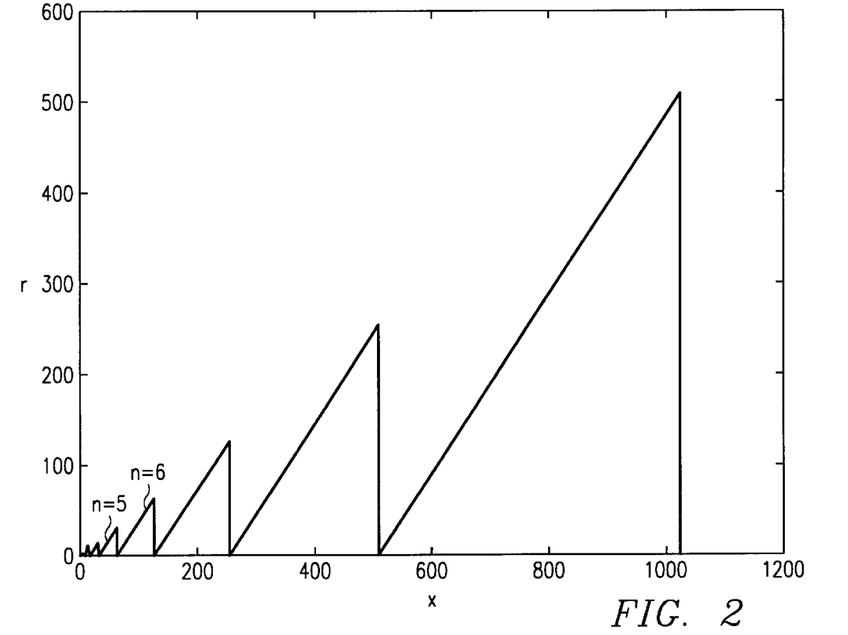
FIG. 2 illustrates a plot of r for the function of $r=x-2^n$, where x is plotted in the horizontal dimension and n increases for each region of x.

Looking first to FIG. 2, it plots the value of r in the vertical dimension, while its horizontal dimension plots the value of x, and it is first instructive to further scrutinize the value of n as its changes across the horizontal plot of the Figure. Specifically, recall it was shown earlier that n relates to the MSD of a binary representation. Given this, all binary numbers x having the same MSD share the same value of n. For example, recall that for x=43, MSD=n=5. More precisely, the region of x bounded by the criterion that the MSD=5 is shown in the following Equation 14, and is labeled accordingly in FIG. 2:

$$\text{for } n=5, 32=x<64 \qquad \text{Equation 14}$$

As another example consider the earlier instance of x=70; here, the bounded region of all values of x where MSD=6 is shown in the following Equation 15, and is labeled accordingly in FIG. 2:

$$\text{for } n=6, 64 \leq x<128 \qquad \text{Equation 15}$$

Another way of stating the relationship between n and x is through the floor function, which is a function that is solved by rounding the result to the nearest integer towards minus infinity. Thus, the relationship between n and x using the floor function is shown in the following Equation 16:

$$n=\lfloor log_2(x) \rfloor \qquad \text{Equation 16}$$

Given the above, one skilled in the art will appreciate that the plot of FIG. 2 graphically demonstrates, among other things, that the value of n is a function of the bounded region within which x falls. Thus, the earlier discussion of determining n by identifying the MSD is a preferred method for determining, for a given value of x, the bounded region within which that value of x falls. For example, by determining that MSD=n=5 for x=43, then it is known that x falls within the region bounded by $32 \leq x<64$.

Looking now to FIG. 2 and the value of r as x (and n) increases, various observations are made in view of each bounded region of x and for purposes of later comparison with FIG. 3. First, r equals 0 when x equals exact powers of 2 (i.e., x=2, 4, 8, 16, etc.). Second, r has a positive and linear slope for each value of n. Third, for each different value of n, there is a different maximum of r.

Figure 3:
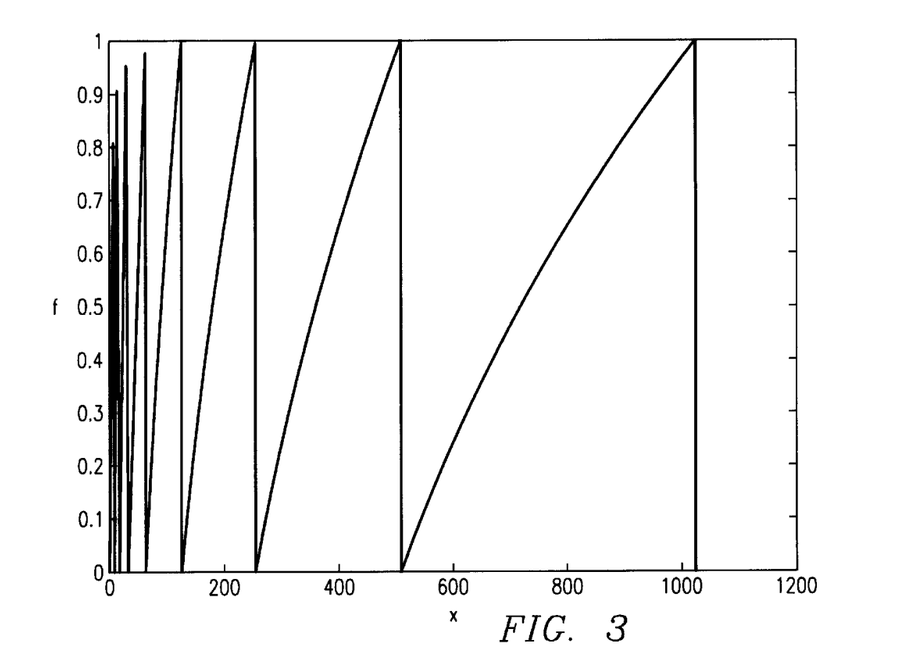
FIG. 3 illustrates a plot for the function of $f=\log_2(x)-i$, where x is plotted in the horizontal dimension and i increases for each region of x.

Looking now to FIG. 3, it plots the value of f along the vertical dimension, while its horizontal dimension plots the value of x. Looking then to the value of f as x (and n) increases, various observations are made with respect to the bounded regions and are later examined in view of the above observations concerning FIG. 2. First, as with the case of FIG. 2, f equals 0 when x equals exact powers of 2 (i.e., x=2, 4, 8, 16, etc.). Second, also as with the case of FIG. 2, f has a positive slope for each value of n. Here, however, note that the positive slope is not linear. Third, and unlike FIG. 2, for many different values of n, r has a same or similar maximum.

Having now described the effects of r and f through the use of FIGS. 2 and 3, recall that r exists in the bits other than the MSD in a binary representation; thus, it is now demonstrated how these bits are processed by a digital circuit to derive an approximate value of f, thereby completing an approximate solution to Equation 3. In other words, as various additional aspects of the present embodiments, there is now a discussion of how the value of r may be related and manipulated to represent a value of f. In this regard, and as seen from a visual standpoint, the previous discussion has illustrated that there are certain similarities between the plots of FIGS. 2 and 3. These similarities include the first two observations made for each of these Figures above, that is, that the results equal 0 for the same values of x for each plot, and there is a positive slope for each plot within each bounded region corresponding to a value of n. Moreover, from a visual inspection of the plots, it further may be appreciated that these slopes are similar, although recognizing that the slope is linear for FIG. 2 while it is not for FIG. 3. In any event, the present embodiments capitalize on these similarities by in effect mapping a value of r as shown in the plot of FIG. 2 to become a value, or an approximation thereof, off as shown in FIG. 3. Once this is achieved, as may be done in various manners described below, then the value of f may be combined with the earlier-found value of i as suggested by Equation 4, thereby completing the preferred method for approximating the solution to Equation 3.

Having now graphically illustrated the possibility of relating r to f, a method of the present embodiment for establishing f given a value of r is based on first determining a ratio between r and f given the plots of FIGS. 2 and 3, where in the preferred embodiment this ratio is developed using a given point in each bounded region of x. Thus, let the ratio be defined by the following Equation 17:

$$s = \frac{f}{r} \qquad \text{Equation 17}$$

From Equation 17, the following discussion determines an acceptable value of s; given that value, in the preferred embodiment it is stored or otherwise represented in a digital circuit and thereafter, given a value of r as appearing in a binary representation, it may be mapped or converted by in effect multiplying it times s to result in an approximation of f. Thus, the ratio s is developed below.

Table 4 below is instructive in developing a value for s:

TABLE 4

| x | range of x $x_L \leq x < x_H$ | n | s = f/r (calculation) | s = f/r (result) | m |
|---|---|---|---|---|---|
| 3 | $2 \leq x < 4$ | 1 | $\log_2(3) - \log_2(2)$ | 0.5850 | 1 |
| 6 | $4 \leq x < 8$ | 2 | $(\log_2(3) - \log_2(2))/2$ | 0.2925 | 2 |
| 12 | $8 \leq x < 16$ | 3 | $(\log_2(3) - \log_2(2))/4$ | 0.1462 | 4 |
| 24 | $16 \leq x < 32$ | 4 | $(\log_2(3) - \log_2(2))/8$ | 0.0731 | 8 |
| ... | ... | ... | ... | ... | ... |
| m*3 | $\frac{x_L}{2} \leq x < \frac{x_H}{2}$ | | $(\log_2(3) - \log_2(2))/m$ | | m |

In Table 4, x is shown for values that are midpoints for each bounded region $x_L : x_H$ where x is greater than or equal to a lower value $x_L$ and less than a higher value $x_H$, and where each bounded region corresponds to a value of n in FIGS. 2 and 3. For example, for n=1, then $x_L \leq x < x_H = 2 \leq x < 4$. Accordingly, the midpoint for this region including 2 and up to 4 is 3, as shown in the first row of Table 4. This midpoint as well as the midpoints of the other bounded regions, and as will be appreciated from the following, provides a basis for developing s. As another example, for n=2, then $x_L \leq x < x_H = 4 \leq x < 8$, and the midpoint for this region including 4 up to 8 is 6, as shown in the second row of Table 4.

The fourth column of Table 4 illustrates the ratio of f/r and, in doing so, demonstrates a pattern for each row for both the numerator and the denominator of this ratio. Specifically, the numerator is a constant equal to $\log_2(3) - \log_2(2)$, and for purposes of reference in the remainder of this document is referred to as $s_{const}$. Additionally, the denominator changes for each increase in the value of n. This denominator, for purposes of reference in the remainder of this document, is referred to as m, and is also shown in the last column of Table 4. Moreover, a relationship between x and m is also established by the rows of Table 4, namely, at the midpoint for each successive row (i.e., each increase in n), x=m*3. Given the above, the following Equation 18 provides a value for s:

$$s = \frac{f}{r} = \frac{s_{const}}{m} = \frac{\log_2(3) - \log_2(2)}{m} = \frac{0.585}{m} \qquad \text{Equation 18}$$

Since Equation 18 illustrates that s is defined in terms of a constant $s_{const}$ (i.e., 0.585) and m, then to provide a complete solution for s it is now helpful to further evaluate the value of m. In this regard, from Table 4 it is readily perceivable that the relationship between m and x may be defined in view of the bounded regions within which x falls, in that m relates to XL for a given value of x, as set forth by the following Equation 19:

$$m = \frac{x_L}{2} = x_L \times 2^{-1} \qquad \text{Equation 19}$$

In addition, from the above and by way of illustration in Table 4, a relationship exists between $x_L$ and n and is defined by the following Equation 20:

$$x_L = 2^n \qquad \text{Equation 20}$$

Therefore, by substituting the value of $x_L$ from Equation 20 into Equation 19, then the value of m is defined by the following Equation 21:

$$m = \frac{2^n}{2} = 2^n \times 2^{-1} = 2^{n-1} \qquad \text{Equation 21}$$

Finally, the value of m from Equation 21 may be substituted into Equation 18 to realize the value of s as shown in the following Equation 22:

$$s = \frac{s_{const}}{m} = \frac{0.585}{2^{n-1}} = 0.585 \times 2^{-(n-1)} = 0.585 \times 2^{-n+1} \qquad \text{Equation 22}$$

Having developed a solution for s, recall from Equation 17 that the purpose of s is to provide a value of f given the binary representation provided by r. Thus, substituting now the value of s from Equation 22 into Equation 17 yields the following solution for f as shown in Equation 23, and which is an approximation of f since it is based on analyses of the midpoints of x within each bounded region corresponding to a value of n:

$$f \approx s \times r = 0.585 \times 2^{-n+1} \times r \qquad \text{Equation 23}$$

Given the above, the present inventor has now shown in this document a solution to both terms of Equation 4, that is, both i and f have been demonstrated. Thus, by way of conclusion at this point, these solutions may be inserted into Equation 4 and thereby identify an estimate of the base 2 logarithm as realized by one embodiment of the present inventive scope, as is shown by the following Equation 24:

$$\log_2(x) \approx i + f = n + (s \times r) = n + (0.585 \times 2^{-n+1} \times r) \qquad \text{Equation 24}$$

The solution shown by Equation 24 yields a base 2 logarithm which is desirable and advantageous for various reasons as may be ascertainable by one skilled in the art, where some examples of these reasons are further explored below.

Figure 4:
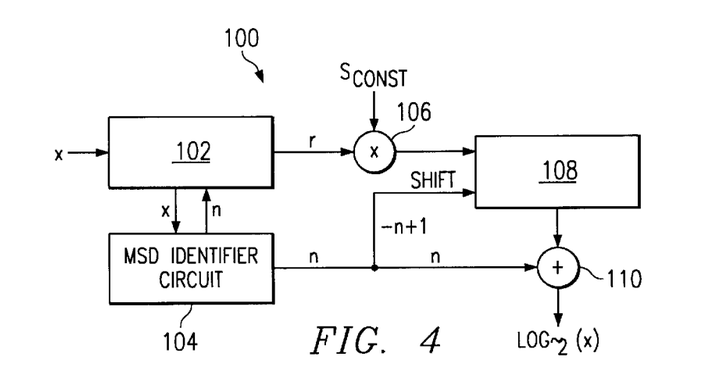
FIG. 4 illustrates a block diagram of a first digital system for approximating a base 2 logarithm, and which operates in part to map the plot of FIG. 2 to the plot of FIG. 3.

One benefit arising from Equation 24 is that it provides a logarithm solution, based on an approximation, that does not require complicated logarithm circuitry and instead may be determined using relatively straightforward circuitry as shown by way of example in FIG. 4. Particularly, FIG. 4 illustrates a block diagram of a digital logarithm approximation system 100. Thus, system 100 may be incorporated, by way of example, into RMS estimator 18 in FIG. 1 to provide the logarithm functionality of that circuit for reasons discussed earlier. Turning now to system 100, it includes a storage device 102 (e.g., register or memory space) for storing the binary representation of x. Storage device 102 is coupled to provide its full value to an MSD identification circuit 104, and MSD identification circuit 104 reports the value of n back to storage device 102. Additionally, storage device 102 is coupled to provide the value of r to a multiplier 106. In this regard, recall from Equation 5 that r is what remains from x after subtracting the largest power of 2, or in other words r is all bits in x other than the MSD. In the preferred embodiment, and given that x is represented in binary fashion in storage device 102, this determination of r is made by toggling the MSD to equal 0. One skilled in the art may readily confirm that this toggling operation in effect removes from x its highest power of 2, thereby leaving the resulting r coupled to multiplier 106. Of course, other alternatives for deriving r from storage device 102 may be implemented, such as identifying the MSD in storage device 102 and then copying only the bits which are less significant than the MSD to multiplier 106. Multiplier 106 is further coupled to receive $s_{const}$, which as discussed thus far equals 0.585 and may be provided to multiplier 106 from storage or the like. The product from multiplier 106 is coupled to a shift register 108, which has a shift input coupled to receive the value of $-n+1$ from MSD identifier circuit 104. Alternatively, note that shift register 108 could receive the value of n and include sufficient circuitry, or be coupled to such circuitry, to determine from n the value of $-n+1$, where this determined value is important for reasons discussed below. The output of shift register 108 is coupled to an input of an adder 110, which has another input coupled to receive the value of n from MSD identifier circuit 104. In this regard and also as discussed later, note that adder 110 may be replaced in some instances by a circuit which concatenates the output of shift register 108 and n. The output of adder 110 provides the approximated solution to Equation 3, namely, the approximate base 2 logarithm of x.

The operation of system 100 is appreciated by one skilled in the art given the preceding teachings, and is best summarized in view of Equation 24. Briefly, therefore, MSD identifier circuit 104 determines the location of the MSD in register 102. In this regard, MSD identifier circuit 104 may be implemented in various manners. For example, MSD identifier circuit 104 may include a shift register which copies into it the value of x from register 102, and then successively shifts the copied value to the right while checking after each shift to identify once the shifted value equals one. As an another alternative, the shift register could shift the value of x to the left while checking after each shift to identify once the shifted value equals or exceeds the largest power of 2 which may be stored in the register. As an another alternative approach to implementing MSD identifier circuit 104, it could include a logic circuit that implements a truth table based on a word of w bits stored in register 102, and that provides an output word that identifies the MSD in the v-bit word. As still another approach, a binary search technique could be used that, by way of example, searches portions of the word stored in register 102 and then eliminates various portions to eventually converge on the location of the MSD. In any event, once the MSD is identified, that determination is used to identify the remaining bits in register 102, where from the preceding discussion it is noted that these remaining bits equal r. Accordingly, from this determination, multiplier 106 determines the value of $s_{const} \times r$, and the result is stored in shift register 108. In addition, identifier circuit 104 reports the value of n to adder 110 and the value of $-n+1$ to shift register 108, each of which operates as described below.

In the embodiment of FIG. 4, shift register 108 shifts the product of $s_{const} \times r$ according to the value of $-n+1$. More particularly, system 100 achieves the multiplication times $2^{-n+1}$ from Equation 24 without requiring an actual calculation involving an exponent and without a multiplier operation; instead, these operations are achieved by shifting the product of $s_{const} \times r$ in the appropriate direction. In other words and as known in the digital art, a multiplication of a factor times 2 to a positive power may be achieved by shifting the factor to the left a number of times equal to the positive power, and a multiplication of 2 to a negative power may be achieved by shifting the factor to the right a number of times equal to the negative power. Accordingly, in the present embodiment such shifting operations are achieved using shift register 108 in response to the value of $-n+1$. Lastly, the shifted result is provided by shift register 108 to adder 110, which then adds it to the value of n from MSD identifier circuit 104. The result is the approximation from Equation 24 and, thus, is the approximation of $\log_2(x)$. Also in this regard, recall it is earlier noted that adder 110 may be replaced by a circuit which concatenates the output of shift register 108 and n. In this alternative, therefore, this concatenation produces the same result as adder 110, that is, the approximation of $\log_2(x)$, and does so without requiring an adder circuit. Accordingly, either an adder or concatenation combines the integer and decimal portions of the solution and, therefore, one or the other may be selected by one skilled in the art given various considerations, including additional ones detailed later.

From the above discussion of FIG. 4, it now may be appreciated as stated above that the preferred embodiment implements a circuit and method for implementing Equation 24 without complex or extensive logarithm circuitry. Instead, the preferred method may be achieved using simply an adder and multiplier, or indeed, if concatenation is used in lieu of adder 110, then solely with a multiplier and a concatenation operation. Alternatively, these functions may be achieved through circuitry for performing addition and multiplication, such as through an arithmetic logic unit ("ALU") or the like. In any case, one skilled in the art will appreciate that the savings for the ease of implementing this methodology may greatly justify accepting the approximate solution of Equation 24 rather than requiring a more precise determination of the logarithm function.

Figure 5:
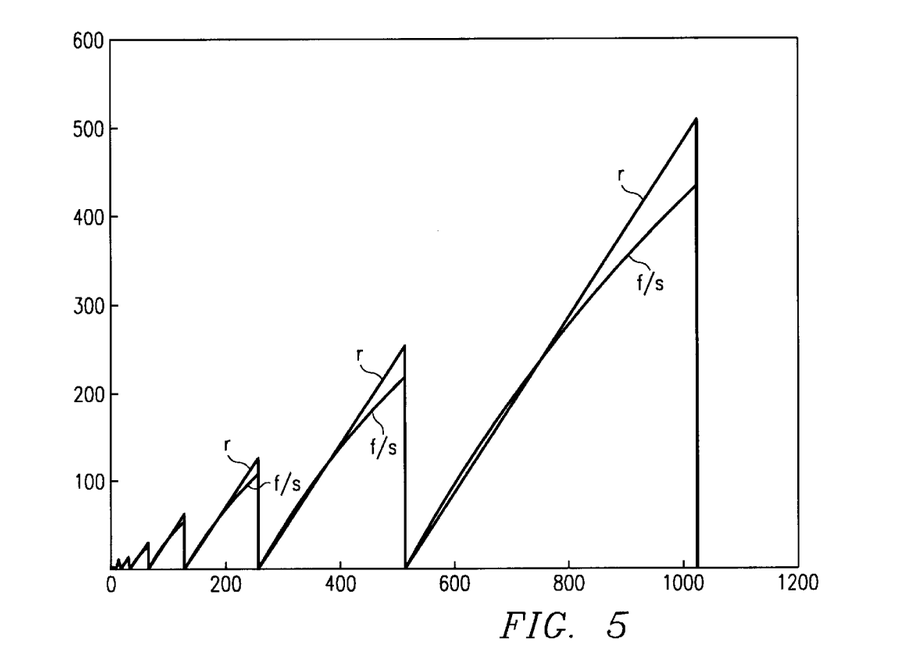
FIG. 5 illustrates a plot which relates in part the results of the approximation of $\log_2(x)$ as achieved by the system of FIG. 4 by demonstrating a relationship between r of FIG. 2 to a scaled plot of f in FIG. 3.

The benefits of the preferred embodiment are further demonstrated in FIG. 5, which illustrates plots of r and f/s and, therefore, represents the results of the approximation of the present embodiment for the non-integer portion of both the actual function of $\log_2(x)$ versus the approximation of $\log_2(x)$. More particularly, the actual function of $\log_2(x)$ is represented in FIG. 5 as plot r while the approximation of $\log_2(x)$ is represented as plot f/s. From this illustration, one skilled in the art will appreciate how plot f/s approximates plot r. Generally and from a visual standpoint, the area between these plots may be viewed as the overall amount of error between the actual logarithm and the approximation of the logarithm. Accordingly, it may be appreciated that this error is relatively small, and particularly for certain values of x. Indeed, it may be appreciated further that the error reduces within each bounded region of x (i.e., each range corresponding to a value of n) at the midpoint of x within that range and, moreover, the two curves intersect each other at each such midpoint. This result should be expected since Table 4, and Equation 24 which derives from Table 4, are based on a methodology deriving from the use of midpoints for each bounded region of x.

The preceding teachings and the illustrations of FIG. 5 also introduce another embodiment within the present inventive scope. Specifically, the illustration of FIG. 5 demonstrates that, for each bounded region of x corresponding to a value of n, the error between the plots is greater above the midpoint than it is below the midpoint As a result, an alternative embodiment adjusts the value of $s_{const}$ to a value which further balances the amount of error between the plots both below and above the midpoint values for x. In this regard, it has been empirically determined by the present inventor that a value of $s_{const}$=0.54 more evenly distributes the error and, thus, in an alternative embodiment, this value of $s_{const}$ is used in Equation 24 in lieu of the factor of 0.585. Moreover, still additional alternatives may be derived where $s_{const}$ is somewhere within the range including 0.54 and 0.585, or by further refining the value of $s_{const}$ to a value providing an exact minimal error or otherwise desirable value, where such values could be computed or found numerically given the present inventive teachings. Still further, yet other embodiments may be created where each bounded region of x is further divided into small segments such that the value of $s_{const}$ differs for each such segment. Graphically, therefore, this approach could be illustrated by a curve similar to that in FIG. 5, where for each bounded region of x, the factor off/s changes for each different segment within that bounded region. Additionally, for each bounded region, f/s therefore intersects r at each endpoint of each segment, rather than only at a single point (e.g., midpoint) within the region as is the case in FIG. 5. In this alternative, once the bounded region is determined, then the segment within the region is also identified and the value of $s^{const}$ corresponding to the segment is used. This alternative provides greater accuracy in the approximation, but there is a trade-off in that the different values for $s_{const}$ increase complexity.

The preceding demonstration of the flexibility of s in the base 2 logarithm function introduces still another alternative embodiment. Particularly, since $s^{const}$ in the preceding discussion suggests an approximation at values of either 0.585 or 0.54, then it is further noted by the present inventor that the hardware implementation for determining Equation 24, such as that illustrated as system 100 in FIG. 4, may be simplified further by setting $s_{const}$=0.5. Of course, this alternative value provides a different amount of error than either $s_{const}$=0.585 or $s_{const}$=0.54, so it is left to one skilled in the art to determine whether the alternative error is justified by the reduced amount of implementation complexity. Looking more specifically to this reduced complexity, note that a value of $s_{const}$=0.5 may be substituted for the value of 0.585 in Equation 24 to yield the following Equation 25:

$$\log_2(x) \approx i+f = n+(0.5 \times 2^{-n+}\times r) \qquad \text{Equation 25}$$

Next, the factor of 0.5 in Equation 25 may be re-written in terms of a power of 2, with the result as shown in the following Equation 26:

$$\log_2(x) \approx i+f = n+(2^{-1}\times 2^{-n+1}\times r) = n+2^{-n}\times r \qquad \text{Equation 26}$$

By comparing Equation 26 to Equation 24, it now may be appreciated how Equation 26 gives rise to a methodology which may be implemented using less complex circuitry than that for Equation 24 (e.g., less complex than system 100 of FIG. 4). First, Equation 26 does not require a stored value for $S_{const}$ (e.g., 0.585). Second, Equation 26 does not require a multiplication operation as does Equation 24. More specifically, while the Equation 26 determination of $2^{-n}\times r$ on its face represents a multiplication operation, recall from the earlier discussion of system 100 that an operation involving a multiplication of a factor times a power of 2 may be achieved by shifting the factor either right or left depending on the power of 2, as will be further appreciated from the following discussion of FIG. 6.

Figure 6:
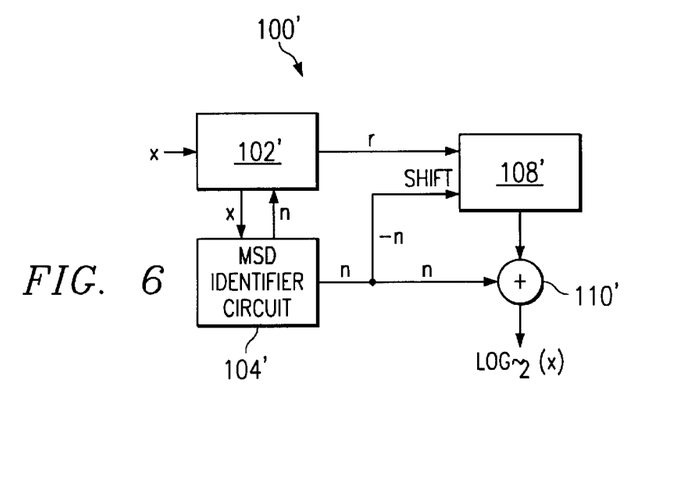
FIG. 6 illustrates a block diagram of a second digital system for approximating a base 2 logarithm, and which requires less sophisticated circuitry than the first digital system of FIG. 4.

To further illustrate the contrast between Equations 26 and 24, FIG. 6 illustrates a block diagram of a system 100' to implement Equation 26, and which is comparable in various respects to system 100 of FIG. 4 which implements Equation 24. In FIG. 6, system 100' uses like reference numerals from FIG. 4, but apostrophes are added to the reference numerals so that various items may be related to their counterparts in FIG. 4. Given the detail presented above with respect to system 100, system 100' is now discussed in a more summary fashion. In system 100', once again x is stored in a storage device 102', and its value is coupled to an MSD identifier circuit 104'. However, in system 100', no multiplier is necessary; instead, the value of r from storage circuit 102' is coupled directly to shift register 108', which has a shift input coupled to receive the value of −n from MSD identifier circuit 104'. Again, shift register 108' operates to shift its stored value to in effect achieve a multiplication times a power of 2, where here that power is defined by −n. Thus, shift register 108' shifts its stored value to the right, where the number of shifts equals n. The shifted output is then coupled to an input of an adder 110', which also receives the value of n as an addend. Additionally, as in the case of FIG. 4, adder 110' of FIG. 6 in some instances may be replaced by a concatenating circuit. Finally, adder 110' (or the concatenation) produces at its output the base 2 logarithm of x as represented in Equation 26.

To further illustrate system 100' and Equation 26, a numeric example is now presented, namely, with x=329.40625. In this case, the binary representation of 329.40625 is shown in the following Table 5:

TABLE 5

| Binary value for x = 329.40625 | 1 | 0 | 1 | 0 | 0 | 1 | 0 | 0 | 1 | 0 | 1 | 1 | 0 | 1 |
|---|---|---|---|---|---|---|---|---|---|---|---|---|---|---|
| Bit position | 8 | 7 | 6 | 5 | 4 | 3 | 2 | 1 | 0 | −1 | −2 | −3 | −4 | −5 |

From Table 5, it is seen that, for x=329.40625, the MSD=n=8. Thus, according to Equation 6, $1 = 2^{MSD} = 2^8 = 256$. Still further, from Equation 5, r is the remainder of x after 1 is removed and, thus, r=73.4062. Next, substituting n and r into Equation 26 provides the approximate base 2 logarithm of x, which in this example is shown in the following Equation 26.1:

$$\log_2(x) \approx n+2^{-n}\times r = 8+(2^{-8}\times 73.4062) = 8.2867 \qquad \text{Equation 26.1}$$

From a calculator, the actual base 2 logarithm for x may be confirmed as 8.3637 and, thus, one skilled in the art will appreciate the amount of error between the approximate and actual values.

The preceding example of Equation 26.1 relates to a solution where the base 2 logarithm is a positive number. One additional consideration arises, however, where the base 2 logarithm is a negative number (i.e., when 1<x<0). By way of introduction to this consideration, another example of system 100' and Equation 26 is now presented, and in this example x=0.3516. In this case, the binary representation of 0.3516 is shown in the following Table 6:

TABLE 6

| Binary value for x = 0.3516 | 0 | 0 | 1 | 0 | 1 | 1 | 0 | 1 |
|---|---|---|---|---|---|---|---|---|
| Bit position | 0 | −1 | −2 | −3 | −4 | −5 | −6 | −7 |

From Table 6, it is seen that, for x=0.3516, the MSD=n=−2. Thus, according to Equation 6, $l=2^{MSD}=2^{-2}=0.25$. Still further, from Equation 5, r is the remainder of x after l is removed and, thus, r=0.1016. Next, substituting n and r into Equation 26 provides the approximate base 2 logarithm of x, which in this example is shown in the following Equation 26.2:

$$\log_2(x) \approx n + 2^{-n} \times r = -2 + (2^{-(-2)} \times 0.1016) = -1.5936 \qquad \text{Equation 26.2}$$

From a calculator, the actual base 2 logarithm for x may be confirmed as −1.5080. In addition, note that the operation of Equation 26.2 demonstrates that an actual addition operation is required, that is, a concatenation is not an acceptable substitute for addition when 1<x<0. More specifically, if concatenation were used in this instance, the result would be −2.4064 and, hence, would be far less accurate and, indeed, would not provide the same mapped relationship which provides the basis for the preferred embodiments. Accordingly, the present example further illustrates that the determination of whether a substitution of concatenation for adder 110 and 110', of systems 100 and 100', respectively, should be considered in view of whether negative logarithms will be involved in the given implementation.

From the above discussion of FIG. 6 and subsequent examples, it now may be appreciated that the embodiment it illustrates is able to achieve an approximate base 2 logarithm determination without complex or extensive logarithm circuitry and, indeed, is even less complex than the embodiment of FIG. 4. In this latter respect, note that no multiplier is required and, thus, there is a significant reduction in the circuitry while still accomplishing the logarithm determination. Moreover, the addition operation also may be eliminated in some cases through the use of a concatenation operation. Additionally, here again the method demonstrated by FIG. 6 may be achieved through an ALU or the like, but in such a case the demands on the ALU are less than those required by the method corresponding to FIG. 4. In any event, one skilled in the art will appreciate that the savings for the ease of implementing the FIG. 6 methodology may justify accepting the approximate solution of Equation 26 rather than requiring a more precise determination of the logarithm function.

Having now developed various embodiments directed to approximating a logarithm, further within the inventive scope is the inverse operation, that is, the inverse logarithm (or referred to herein as the antilog). By way of context, recall from the discussion of FIG. 1 that such an operation may arise where the amplitude of an input signal has been measured as a value of x, and a logarithm has been take to establish f(x). Next, to perform a gain adjustment, it is desirable to once again determine a value x, as it relates to processing of the input signal. Additionally in this context, note that some intermediate steps have occurred to the value of f(x) before the antilog evaluation occurs, so the actual result of the antilog returns a value of x that differs from the original value of x as measured relative to the input signal. In any event, however, the antilog produces a value that in some manner relates to the input signal, and in the example of FIG. 1 is used with respect to the gain adjustment operation.

By way of further introduction to the antilog embodiments, note in view of the above, the following discussion now sets forth to provide an embodiment which presents x, given a binary representation of the base 2 logarithm of x (i.e., given the value of i+f). Since the current embodiment sets forth to perform an inverse of the earlier-described logarithm embodiments, it is also now noted that the preferred method of translating i+f back to the value of x also is achieved through separate analyses concerning the integer and decimal portions of i+f and, here, i is related to n which relates to I as defined above, and then f is related to r. Thereafter, recall that l and r are summed to determine x. Lastly, note that the following antilog embodiments preferably also pertain to base 2, but as discussed earlier with respect to logarithms, the following antilog teachings also may apply to other base systems such as base 10.

To better illustrate the antilog embodiment, several of the earlier Equations are now re-stated simply to have them readily accessible for view and discussion, and from which the antilog embodiment may be confirmed. Specifically, immediately below are set forth Equations 7, 8, and 24, which were explored in detail in the previous discussions:

$$x = l + r = 2^n + r \qquad \text{Equation 7}$$

$$n = \text{MSD} = i \qquad \text{Equation 8}$$

$$\log_2(x) \approx i + f = n + (s \times r) = n + (0.585 \times 2^{-n+1} \times r) \qquad \text{Equation 24}$$

Having developed the relationships established by these Equations, it is now explored how they may relate to solving for x given the other terms.

Equations 7 and 8 demonstrate a first portion of the inverse operation, namely, developing l based on i. Specifically, since Equation 8 demonstrates that n=i, then l from Equation 7 is readily ascertained by raising 2 to the power of i (which due to Equation 8 is the same as saying 2 to the power of n). Accordingly, at this point a partial solution has been determined for x in that l, the highest power of 2 that is less than x, is now established. Thus, a determination of r may be used to complete Equation 7, thereby permitting an approximation of x.

Looking now to the relationship of f to r, and by substituting the value of n=i from Equation 8 into Equation 24, the following Equation 27 results:

$$\log_2(x) \approx n + f = n + (0.585 \times 2^{-n+1} \times r) \qquad \text{Equation 27}$$

Next, n is subtracted from both sides of the equality of Equation 27, leaving the following Equation 28:

$$f = (0.585 \times 2^{-n+1} \times r) \qquad \text{Equation 28}$$

Next, Equation 28 is solved for the value of r, which results in the following Equation 29:

$$r = \frac{f}{0.585 \times 2^{-n+1}} = \frac{f}{0.585} \times 2^{n-1} \qquad \text{Equation 29}$$

The value of r from Equation 29 is now substituted into Equation 5, thereby providing the following Equation 30 which thus provides an approximation of the base 2 antilog function:

$$x \approx 2^n + \frac{f}{0.585} \times 2^{n-1} \qquad \text{Equation 30}$$

Recall that the earlier embodiments of systems 100 and 100' have demonstrated that multiplication of a power of 2 may be achieved through shifting a binary representation. Thus, for this purpose Equation 30 may be simplified further by factoring out a term of $2^{n-1}$, which results in the following Equation 31:

$$x \approx 2^{n-1}\left(2 + \frac{f}{0.585}\right) \qquad \text{Equation 31}$$

Lastly, recall that the value of 0.585 is defined earlier as the constant $s_{const}$. Thus, this value when substituted into Equation 31 yields the following Equation 32:

$$x \approx 2^{n-1}\left(2 + \frac{f}{s_{const}}\right) \qquad \text{Equation 32}$$

Figure 7:
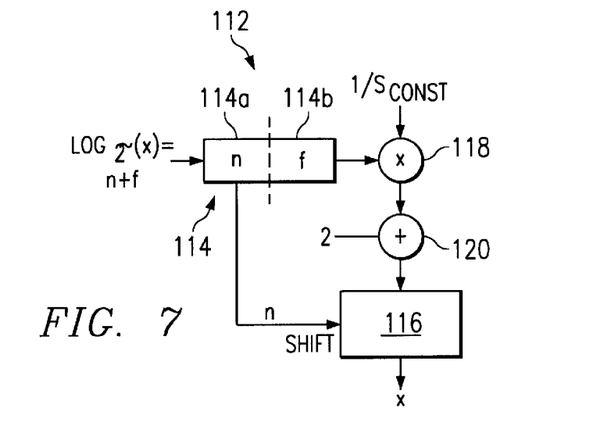
FIG. 7 illustrates a block diagram of a digital system for approximating a positive inverse base 2 logarithm.

From Equation 32, therefore, one skilled in the art will appreciate that an approximation of the base two antilog is also within the present inventive scope. Further to illustrate this aspect, FIG. 7 illustrates a block diagram of an antilog approximation system 112. Thus, system 112 may be incorporated, by way of example, into gain circuit 20 in FIG. 1 to provide the antilog functionality of that circuit for reasons discussed earlier. Turning then to system 112 in detail, it includes a storage device 114 (e.g., register or memory space) for storing the binary representation of the $\log_2(x)$, where that representation includes the value of n (or i) and f as defined above; more specifically, the value of n is stored in a first portion 114a of storage device 114 while the value of f is stored in a second portion 114b of storage device 114. Alternatively, portions 114a and 114b could be separate storage devices. In any event, first portion 114a couples the value of n-i to a shift register 116 or, in a manner comparable to the discussion above for systems 100 and 100', it may couple the value of n to shift register 116 with that register then capable of either directly or indirectly determining the value of n-1. Second portion 114b couples the value of f to a multiplier 118. Multiplier 118 is further coupled to receive the value of $1/s_{const}$, where that value may be retrieved from storage or the like. In this regard, note that $s_{const}$ may be one of various numbers as detailed above (e.g., 0.585, 0.54, 0.5). The product from multiplier 118 (i.e., $f_{const}$) is coupled to an adder 120, which further receives the value of 2 as an addend. In this regard, since adder 120 merely adds a value of 2 in each operation as further evident below, it may be logic which is less complicated than typical full operation adder circuits. The output of adder 120 is coupled to the input of shift register 116, and the output of shift register 116 provides the result x of the approximation of the antilog function.

The operation of system 112 is appreciated by one skilled in the art given the preceding teachings, and is best summarized in view of Equation 32. Briefly, therefore, multiplier 118 determines the value of $1/s_{const} \times f$, the product is added to 2 by adder 120, and the sum is stored in shift register 116. Next, shift register 116 shifts the sum from adder 120 according to the value of n-1 which therefore achieves the effect of the multiplication times $2^{n-1}$ from Equation 32 without requiring an actual calculation involving an exponent and without a multiplier operation; instead, these operations are achieved by shifting the value of $$2 + \frac{f}{s_{const}}$$

in the appropriate direction. Lastly, the shifted result is output by shift register 116 as the approximation from Equation 32 and, thus, is the approximation of the inverse of $\log_2(x)$.

To appreciate an alternative antilog embodiment, recall it is noted above that $s_{const}$ for Equation 32 may be equal to 0.5. In this case, Equation 32 reduces to the following Equation 33:

$$x \approx 2^{n-1}\left(2 + \frac{f}{s_{const}}\right) = 2^{n-1}\left(2 + \frac{f}{2^{-1}}\right) \qquad \text{Equation 33}$$
$$= 2^{n-1}(2 + 2f) = 2^n(1 + f)$$

Equation 33, therefore, gives rise to an embodiment as an alternative to system 112, where the alternative does not require a multiplier such as multiplier 118. Specifically, once the sum of 1+f is determined, Equation 33 may be satisfied by shifting that sum to achieve the effect of the multiplication times $2^n$. The result therefore is yet another approximation of the base 2 antilog.

The preceding antilog embodiments are directed to antilog operations that produce results (i.e., approximations) that are greater than or equal to 1, that is, where i+f is greater than or equal to 0. However, where i+f is a negative number, then a properly evaluated antilog function produces a between 0 and 1. In connection with the present embodiments, it has been determined that further modifications must then be made for such instances. By way of introduction, recall from above that the antilog embodiment attempts to approximate x, given a binary representation of the base 2 logarithm of x (i.e., given the value of i+f). Here again, a preferred embodiment for approximating the antilog is based on the earlier embodiment for approximating the logarithm, but some additional alterations arise in view of the fact that i+f is less than 0, as detailed below.

The preferred embodiment approaches the antilog approximation of a negative number in a comparable manner as the logarithm approximation, by again starting with the notion of Equation 4, which is re-stated here for convenience of the reader:

$$\log_2(x) = i + f \qquad \text{Equation 4}$$

where, i is the integer portion of the solution of Equation 4; and f is the decimal portion of the solution of Equation 4.

Recall that the earlier-described logarithm embodiments sought separately to relate n to i and to relate r to f, here, the opposite approach is taken, that is, the antilog of a negative number seeks an approximation by separately analyzing n based on i, and r based on f Each of these separate analyses is discussed below.

To demonstrate the relationship between n and i for the embodiment taking the antilog of a negative number, attention is now returned to the earlier example of Table 6, that is, where x=0.3516 and the approximate base 2 logarithm of x is −1.5936. Thus, i=−1, and f=−0.5936. Additionally, however, recall from the earlier discussion of Table 6 and Equation 26.2 that n=MSD in this case equals −2. Accordingly, i and n do not match. Stating this in greater detail, for the limited instance of an antilog approximation where i+f is negative, then the earlier Equation 8 relationship of i=n does not apply. Instead, the present example demonstrates, as is confirmed by another example below, that for the instance of an antilog of a negative number, the relationship between the MSD (i.e., n) and i is as shown in the following Equation 34:

$$i=n+1 \qquad \text{Equation 34}$$

To better appreciate the proposal of Equation 34, the present example as shown earlier in Equation 26.2 is also re-stated here:

$$\log_2(x) \approx n+2^{-n} \times r = -2+(2^{-(-2)} \times 0.1016) = -1.5936 \qquad \text{Equation 26.2}$$

Equation 26.2 demonstrates that, as in the case of other negative logarithms, the approximation of the preferred embodiment is determined by adding a negative integer value of n (e.g., −2) to a positive fraction, where that positive fraction in the present example equals 0.4064 as determined from the parenthetical factor in Equation 26.2. Also, any time a positive fraction is added to a negative number as is the case in the present embodiment, then the integer portion of the solution will be the negative number increased by 1. In the example of Equation 26.2, therefore, the value of n=−2 is added to the fraction of 0.4064 and, thus, the integer portion of the solution of −1.5936 equals −1; further, it is readily confirmed that this −1 value equals n increased by 1. Given these observations, for the antilog of a negative number, and in terms of the earlier-defined variables, i equals n increased by 1, as shown in Equation 34. Moreover, the present embodiment seeks to determine n given i and, thus, Equation 34 may be re-written as shown in the following Equation 35 to provide for n in this manner:

$$n=i-1 \qquad \text{Equation 35}$$

Equations 34 and 35 may be confirmed through another example, so for this additional example assume that x=0.037109375, as shown in binary fashion in the following Table 7:

TABLE 7

| Binary value for x = 0.037109375 | 0 | 0 | 0 | 0 | 0 | 1 | 0 | 0 | 1 | 1 |
|---|---|---|---|---|---|---|---|---|---|---|
| Bit position | 0 | −1 | −2 | −3 | −4 | −5 | −6 | −7 | −8 | |

From Table 7, it is seen that the MSD=n=−5 and, thus, l=$2^{MSD}$=$2^{-5}$=0.03125 and r, the remainder of x after I is removed, equals 0.005859375. Next, substituting n and r into Equation 26 provides the approximate base 2 logarithm of x, which in this example is shown in the following Equation 26.3:

$$\log_2(x) \approx n+2^{-n} \times r = -5+(2^{-(-5)} \times 0.005859375) = -4.8125 \qquad \text{Equation 26.3}$$

From Equation 26.3, it may be seen that n=−5 and i=−4. Once more, this arises because a positive fraction (i.e., ($2^{-(-5)} \times 0.005859375$)) is added to a negative number n (i.e., −5) and, thus, the integer portion of the solution is the negative number increased by 1; in other words, i=n+1=− 5+1=−4. Accordingly, at this point in the discussion, the preferred methodology has been presented for determining n given the negative integer portion of the logarithm. Therefore, at this point it has been shown that l=$2^n$, which in effect locates the region within which x will fall. Also, since l is now known, from Equation 5 the following must only determine r and, thereafter, l and r may be combined to approximate x.

To demonstrate the relationship between r and f for the antilog of a negative number approximation in the preferred embodiment, attention is again returned to the earlier example of Table 6, that is, where x=0.3516, the approximate base 2 logarithm of x is −1.5936, i=−1, and f=−0.5936. Once more Equation 26.4 is repeated here, but this time to predicate the discussion of the relationship between r and f.

$$\log_2(x) \approx n+2^{-n} \times r = -2+(2^{-(-2)} \times 0.1016) = -1.5936 \qquad \text{Equation 26.4}$$

Looking to Equation 26.4, the relationship between r and f may be observed from this example, and then confirmed later with another example. Specifically, in Equation 26.4, the aspect relating to r is defined by the positive fraction in the parenthetical of ($2^{-(-2)} \times 0.1016$), and the preferred embodiment relates this to the value of f=−0.5936. Additionally, recall from the preceding discussion how i results from adding this positive fraction to a negative value of n. Carrying this analysis one step farther, it is also the case that any time a positive fraction is added to a negative number, as is the case in the present embodiment, then the decimal portion of the solution will be the positive fraction decreased by 1. In the example of Equation 26.4, therefore, the positive fraction of 0.4064 resulting from the parenthetical is added to the negative number of n, and the decimal portion of the result is −0.5936, which is the same as the positive fraction of 0.4064 decreased by 1 (i.e., 0.4064−1=− 0.5936). Further in view of these observations, the decimal portion just discussed is f and, therefore, f may be defined in terms of the parenthetical minus 1 as shown in the following Equation 36:

$$f=(2^{-n} \times r)-1 \qquad \text{Equation 36}$$

Equation 36 is also now confirmed through the second example used above, that is, where x=0.037109375 as was shown in Table 7. For that example, recall that r=0.005859375. Substituting this into Equation 36, and recalling from above that n was found to be −5 based on i, yields the following Equation 37:

$$f=(2^5 \times 0.005859375)-1=-0.8125 \qquad \text{Equation 37}$$

From Equation 37, it may be seen that f is properly determined. Accordingly, at this point in the discussion, the preferred methodology has been presented for determining f given n and r.

To conclude the discussion of the preferred embodiment relating to the antilog of a negative number, recall that the ultimate goal is to provide an approximate value of x. Toward this end, recall from Equation 5 that x is the sum of l and r, and l has been found above. Thus, the present discussion need only provide for r given f, where it was shown above how f relates to r. Accordingly, by rewriting Equation 36 to solve for r, there is the following Equation 38:

$$r = \frac{(f+1)}{2^{-n}} = (f+1) \times 2^n \qquad \text{Equation 38}$$

Therefore, x may be found by adding 1 and r, which results in the following Equation 39:

$$x = 2^n + [(f+1) \times 2^n] \qquad \text{Equation 39}$$

Equation 39 may be simplified by factoring out the value of $2^n$, resulting in the following Equation 40:

$$x = 2^n(1+(f+1)) = 2^n(f+2) \qquad \text{Equation 40}$$

Lastly, substituting Equation 35 into Equation 40 yields the final solution for an antilog of a negative number as shown in Equation 41, and which therefore is defined in terms of i and f as received in a binary representation:

$$x = 2^{(i-1)}(f+2) \qquad \text{Equation 41}$$

Figure 8:
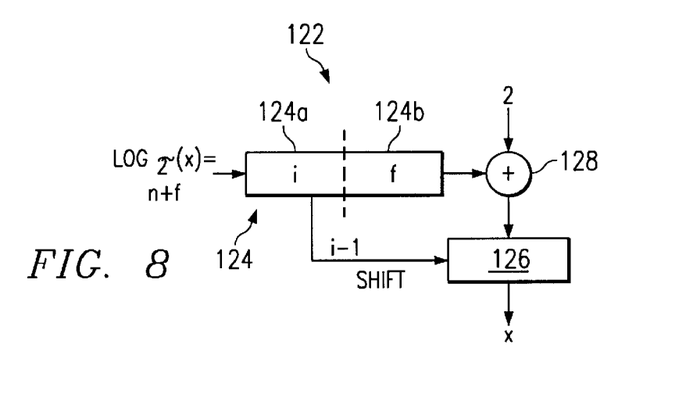
FIG. 8 illustrates a block diagram of a digital system for approximating a inverse base 2 logarithm of a negative number.

From Equation 41, a system comparable to system 112 may be formed to approximate a antilog of a negative number, and such an antilog system 122 is shown in FIG. 8. Moreover, before detailing antilog system 122, it is further contemplated that it may be combined with system 112 of FIG. 7 such that a sign evaluation is made with respect to i, and if the sign is positive then system 112 determines the antilog, whereas if the sign is negative then the system 122 determines the antilog.

Turning then to the construction and operation of system 122, it includes a storage device 124 (e.g., register or memory space) for storing the binary representation of the $\log_2(x)$, where that representation includes the value of i and f as defined above; more specifically, the value of i is stored in a first portion 124a of storage device 124 while the value of f is stored in a second portion 124b of storage device 124. Alternatively, portions 124a and 124b could be separate storage devices. In any event, first portion 124a couples the value of i−1 to a shift register 126 or, in a manner comparable to the discussion above for other systems, it may couple the value of i to shift register 126 with that register then capable of either directly or indirectly determining the value of i−1. Second portion 124b couples the value of f to an adder 128, which further receives as an added the value of 2. In this regard, since adder 128 merely adds a value of 2 in each operation as further evident below, it may be logic which is less complicated than typical full operation adder circuits. The sum from adder 128 is coupled to shift register 126. The output of shift register 128 provides the result x of the approximation of the antilog of a negative number. Given the various components of system 122, and further in view of the operational description of various previous embodiments, one skilled in the art should readily appreciate the operational method performed by system 122. Briefly, therefore, this operations occurs such that adder 128 determines the sum from the parenthetical of Equation 41, and then shift register 126 shifts this sum according to the value of i−1, thereby approximating the value of x given an input of i+f.

As a final matter relative to the antilog of a negative number, note that the preceding discussions and conclusion with Equation 41 are based on a value of $s_{const}=0.5=2^{-1}$. However, as in the previous embodiments, a different value of $S_{const}$ may be implemented. In this case, then the underlying assumption of $s_{const}=2^{-1}$ may be factored into separate components of Equation 36 and solving for f, or rewriting to solve for r, both of which are shown in the following form of Equation 42:

$$f = (s_{const} \times 2^{-n+1} \times r) - 1, \; r = \frac{f+1}{s_{const}} * 2^{n-1} \qquad \text{Equation 42}$$

Since x is approximately equal to $2^n+r$, then substituting the value of r from Equation 42 into this approximation of x and also replacing n as defined in Equation 35 yields the following Equation 43, which may be implemented to present yet another alternative to the antilog of a negative number embodiment, and one which permits the flexibility of altering $s_{const}$:

$$x \approx 2^n + r = 2^{i-1} + \frac{f+1}{s_{const}} * 2^{i-2} \qquad \text{Equation 43}$$

From the above, it may be appreciated that the above embodiments provide numerous advantages and alternatives to implement approximations for base 2 logarithms and base 2 antilogs. However, while the present embodiments have been described in detail, one skilled in the art should appreciate that various substitutions, modifications or alterations could be made to the descriptions set forth above without departing from the inventive scope. For example, while FIG. 1 illustrates a dynamic range compressor, the present embodiments will apply to other circuits relating to audio signal processing. Indeed, it is further likely that the present embodiments are operable in connection with processing other signal types. As another example, while FIGS. 4, 6, and 7 illustrate specific hardware implementations of the various alternative methodologies provided, still other hardware or combined hardware and software implementations will be ascertainable by one skilled in the art. As yet another example, note that the embodiments above are primarily directed to base 2 determinations, as such arise often in the binary context and benefit in the present context from the ability to use the MSD for the reasons described earlier. Nevertheless, many of the present teachings may well apply directly to base 10 or other number based systems, or the results provided by a base 2 embodiment may be scaled according to Equation 2 to produce a result in an alternative numeric base. Thus, these examples as well as others as may be determined by one skilled in the art further illustrate the present inventive scope, as is defined by the following claims.

What is claimed is:

1. A digital signal system for determining an approximate logarithm of a value of x having a base b, wherein the approximate logarithm has an integer portion and a decimal portion, comprising:

an input for receiving a signal;

circuitry for measuring an attribute of the signal, wherein the attribute relates at least in part to the value of x;

circuitry for identifying a bounded region within which x falls;

wherein the bounded region is one of a plurality of bounded regions;

wherein each of the plurality of bounded regions corresponds to a different value of an integer n and is bounded on a lower side by $b^n$ and on a higher side by $b^{n+1}$; and wherein the identified bounded region identifies the integer portion of the approximate logarithm; and circuitry for determining the decimal portion of the approximate logarithm by mapping a portion of x to a point along a curve representing an approximation of a portion of an actual logarithm value of x, wherein each point along the curve representing the approximation of the portion of the actual logarithm value of x is the decimal portion of the actual logarithm value of x times a constant.

2. The system of claim 1 and further comprising circuitry for storing x as a binary representation.

3. The system of claim 2 wherein, for a curve representing each of the portions of x within the bounded region, the curve representing each of the portions of x within the bounded region intersects at least once the curve representing the approximation of the portion of an actual logarithm value of x.

4. The system of claim 3 wherein the curve representing each of the portions of x within the bounded region intersects at a midpoint of the bounded region the curve representing the approximation of the portion of an actual logarithm value of x.

5. The system of claim 4 wherein the circuitry for identifying the bounded region identifies the bounded region in response to a most significant digit of the binary representation.

6. The system of claim 5 wherein the circuitry for determining the decimal portion of the approximate logarithm maps all bits in x with a lesser significant bit position than the most significant digit to the point along the curve representing the approximation of the portion of the actual logarithm value of x.

7. The system of claim 6 wherein the circuitry for determining the decimal portion of the approximate logarithm maps all bits in x with a lesser significant bit position than the most significant digit to the point along the curve representing the approximation of the portion of the actual logarithm value of x by determining a product between all the bits in x with a lesser significant bit position than the most significant digit, a constant, and a value equal to $2^{-n+1}$.

8. The system of claim 7 wherein the constant is within an approximate range between and including 0.5 through 0.585.

9. The system of claim 7 wherein the constant equals 0.54.

10. The system of claim 7 wherein the constant equals 0.585.

11. The system of claim 7 wherein the circuitry for determining the decimal portion comprises:
    circuitry for multiplying all the bits in x with a lesser significant bit position than the most significant digit times the constant to form a first product; and
    circuitry for shifting the first product a number of times equal to −n+1 to form a second product, wherein the second product is the decimal portion.

12. The system of claim 7 wherein the constant equals 0.5.

13. The system of claim 1 wherein the circuitry for determining the decimal portion of the approximate logarithm maps all bits in x with a lesser significant bit position than the most significant digit to the point along the curve representing the approximation of the portion of the actual logarithm value of x by determining a product comprising all the bits in x with a lesser significant bit position than the most significant digit and a constant, wherein the constant is based on a midpoint of the bounded region within which x falls.

14. The system of claim 1 wherein the circuitry for determining the decimal portion of the approximate logarithm maps all bits in x with a lesser significant bit position than the most significant digit to an actual logarithm value of x.

15. The system of claim 1 wherein the signal is an audio signal.

16. The system of claim 1 wherein the attribute of the signal is a signal amplitude.

17. The system of claim 16 wherein the approximate logarithm is a negative number.

18. The system of claim 1 wherein the base b is base 2.

19. The system of claim 1 and further comprising circuitry for combining the integer portion and the decimal portion.

20. The system of claim 19 wherein the circuitry for combining the integer portion and the decimal portion comprises an adder circuit.

21. The system of claim 19 wherein the circuitry for combining the integer portion and the decimal portion comprises a concatenation circuit.

22. The system of claim 21 wherein the approximate logarithm is a positive number.

23. A digital signal system for determining an approximate antilog x from a value of f(x), wherein x has a base b, wherein the value of f(x) has an integer portion and a decimal portion, comprising:
    an input for receiving a signal;
    circuitry for measuring an attribute of the signal, wherein the attribute relates at least in part to the value of f(x);
    circuitry for identifying from the integer portion of f(x) a largest power of b less than the absolute value of x; and
    circuitry for determining from the decimal portion of f(x) a value r representative of a difference between x and b to the largest power.

24. The system of claim 23 and further comprising circuitry for combining the factor of b to the largest power and r to form the approximate antilog x.

25. The system of claim 23 and further comprising circuitry for storing the value of f(x) as a binary representation.

26. The system of claim 23:
    wherein the largest power equals an integer n; and
    wherein the circuitry for determining the value of r determines a product between the decimal portion of f(x), a constant, and a value equal to $2^{-n+1}$.

27. The system of claim 27 wherein the constant is within an approximate range between and including 1/0.5 through 1/0.585.

28. The system of claim 26 wherein the constant equals 1/0.54.

29. The system of claim 23 wherein the signal is an audio signal.

30. The system of claim 23 wherein the base b is base 2.

31. The system of claim 23 wherein the attribute of the signal is a signal amplitude.

32. A digital signal system for determining an approximate antilog x from a value of f(x), wherein x has a base b, wherein the value of f(x) has an integer portion and a decimal portion, comprising:
    an input for receiving a signal;
    circuitry for measuring an attribute of the signal, wherein the attribute relates at least in part to the value of f(x);
    circuitry for identifying from the integer portion of f(x) a largest power of b less than the absolute value of x; and
    circuitry for forming a product between the decimal portion of f(x) raised to the largest power and a value equal to the integer portion of f(x) plus one, wherein the product equals the approximate antilog x.

33. The system of claim 32 and further comprising circuitry for storing the value of f(x) as a binary representation.

34. The system of claim 32 wherein the signal is an audio signal.

35. The system of claim 32 wherein the base b is base 2.

36. The system of claim 32 wherein the attribute of the signal is a signal amplitude.

37. The system of claim 32 and further comprising:
determining circuitry for determining whether the approximate antilog x is a positive number; and
wherein the circuitry for identifying from the integer portion of f(x) a largest power of b less than the absolute value of x identifies that the integer portion of f(x) is the largest power of b less than the absolute value in response to the determining circuitry determining that the approximate antilog x is a positive number.

38. A digital signal system for determining an approximate antilog of a negative number x from a value of f(x), wherein x has a base b, wherein the value of f(x) has an integer portion and a decimal portion, comprising:
an input for receiving a signal;
circuitry for measuring an attribute of the signal, wherein the attribute relates at least in part to the value of f(x);
circuitry for identifying from the integer portion of f(x) a largest power of b less than the absolute value of x, wherein the circuitry for identifying identifies that the largest power of b less than the absolute value of x equals the integer portion of f(x) minus one; and
circuitry for determining from the decimal portion of f(x) a value r representative of a difference between x and b to the largest power, wherein the circuitry for determining the value r comprises:
circuitry for increasing the decimal portion of f(x) to form a sum; and
circuitry for forming a product between the sum and the base b raised to the largest power.

39. A digital signal system for determining an approximate antilog of a negative number x from a value of f(x), wherein x has a base b, wherein the value of f(x) has an integer portion and a decimal portion, comprising:
an input for receiving a signal;
circuitry for measuring an attribute of the signal, wherein the attribute relates at least in part to the value of f(x);
circuitry for determining x, comprising:
circuitry for increasing the integer portion of f(x) by one to form a sum; and
circuitry for forming a product between the sum and the base b raised to a power of the integer portion of f(x) minus one.

40. A digital signal system for determining an approximate antilog of a negative number x from a value of f(x), wherein x has a base b, wherein the value of f(x) has an integer portion and a decimal portion, comprising:
an input for receiving a signal;
circuitry for measuring an attribute of the signal, wherein the attribute relates at least in part to the value of f(x);
circuitry for determining x, comprising:
circuitry for increasing the decimal portion of f(x) by one to form a first sum;
circuitry for forming a first product between the first sum and a constant;
circuitry for forming a second product between the first product and the base b raised to a power of the integer portion of f(x) minus two; and
circuitry for forming a second sum by combining the second product with the base b raised to a power of the integer portion of f(x) minus one, wherein the second sum is the approximate antilog of the negative number x.

* * * * *